May 16, 1933.   A. M. JOHNSON ET AL   1,909,766
MACHINE TOOL
Filed March 28, 1929   4 Sheets-Sheet 4

Inventors:
Albert M. Johnson,
Walter M. Fairbairn,
Attys.

Patented May 16, 1933

1,909,766

UNITED STATES PATENT OFFICE

ALBERT M. JOHNSON AND WALTER M. FAIRBAIRN, OF ROCKFORD, ILLINOIS, ASSIGNORS TO BARNES DRILL COMPANY, OF ROCKFORD, ILLINOIS, A CORPORATION OF ILLINOIS

MACHINE TOOL

Application filed March 28, 1929. Serial No. 350,483.

The present invention relates to improvements in machine tools, and has particular reference to machine tools which are adapted for such operations as tapping and drilling, and which comprise a work support adapted to be indexed periodically, and a rotary tool adapted to be reciprocated toward and from the work support once for each position of the latter.

An important object resides in the provision of a novel hydraulic interlock between the indexing means and the drive for the tool to prevent institution of the drive until the indexing movement in each cycle of operations has been completed.

A more specific object resides in the provision of a novel interlock of the foregoing character controlling a clutch in the drive for the tool to effect a preparatory movement of the clutch first into neutral position, and then into position to institute the feeding stroke of the tool automatically when the indexing movement of the work support has been completed.

Another object of the invention is to provide, in a machine tool having a work support and a tool support mounted for relative reciprocation, a power driven reciprocating mechanism including a clutch, with fluid pressure operated means of a practical character for actuating said clutch and capable of being controlled from a remote point.

Further objects and advantages will become apparent as the description proceeds.

Referring to the drawings.

While the invention is susceptible of various modifications and alternative constructions, we have shown in the drawings and will herein describe in detail the preferred embodiment, but it is to be understood that we do not thereby intend to limit the invention to the specific form disclosed, but intend to cover all modifications and alternative constructions falling within the spirit and scope of the invention as expressed in the appended claims.

Referring more particularly to the drawings, the machine constituting the exemplary embodiment of the invention comprises a base 10 having an upstanding column or pedestal 11. A work carriage 12 is mounted for vertical adjustment on the front of the pedestal 11. Rigidly secured to the top of the pedestal 11 is a head casing 13 in which a tool spindle 14 is mounted for rotation and for traverse movements toward and from the carriage 12.

The head casing 13 is provided with a pair of vertically spaced, forwardly extending portions 15 and 16. The lower portion 15 constitutes a bearing for a vertically reciprocable sleeve 17 through which the spindle 14 extends, the latter being held against longitudinal movement relative to the sleeve in a well known manner. The upper end of the spindle 14 extends through and is journaled in the upper portion 16. A suitable chuck 18 for a cutting tool 19 is removably secured to the lower end of the spindle 14.

Any suitable means may be provided for rotating the spindle 14 in opposite directions, and in the present instance this means comprises a gear 20 keyed to the spindle above the bearing portion 16, a gear 21 meshing with the gear 20 and secured to the upper end of a shaft 22 journaled in a bearing 23 in the casing 13, a bevel gear 24 secured to the lower end of the shaft 22, a second bevel gear 25 secured to one end of a stub shaft 26 journaled in a bearing 27 in the casing 13, a pair of inner and outer bevel gears 28 and 29 secured on the other end of the shaft 26, opposed bevel gears 30 and 31 in mesh respectively with the gears 28 and 29 and loosely mounted on a drive shaft 32 journaled in bearings 33 in the casing 13, and a clutch sleeve 34 splined to the shaft 32 and adapted to connect the gears 30 and 31 selectively to the shaft 32. The shaft 32 may be driven by any suitable means, such as a pulley 35 adapted to be connected to a suitable source of power (not shown). The gears 30 and 31 and the sleeve 34 constitute a reversing clutch, designated generally as 36, for the foregoing train of gearing. The gears 20 and 21 are enclosed in a housing 37, and the clutch 36 is enclosed in a housing 38, both housings being provided on the casing 13.

Suitable means is provided for reciprocating the spindle 14 in a feeding stroke and a return stroke. To this end a gear drive is provided between the shaft 22 and the sleeve 17. This drive preferably comprises a spiral gear 41 on the lower end of the shaft 22 in mesh with a spiral gear 42 on a transverse stub shaft 43 journaled in the casing 13. A gear 44 on the shaft 43 meshes with a gear 45 on another stub shaft 46 journaled in the casing 13. A gear 47 on the shaft 46 meshes with a gear 48 on a shaft 49 journaled in and extending out of the casing 13. Pivotally mounted on the shaft 49 is a gravity housing 50 adapted to be actuated by means of a handle 51 projecting to the front of the machine. A gear 52 on the outer end of the shaft 49 and within the housing 50 meshes with a gear 53 on a stub shaft 54 journaled in the housing and extending into the casing 13. Mounted on the inner end of the shaft 54 is a gear 55 adapted to be moved into and out of mesh with a gear 56, by pivotal movement of the gravity housing 50. The gears 55 and 56 thus constitute a make and break clutch designated for convenience as 57, in the train of gearing just described. The gear 56 is secured to a transverse shaft 58 extending through the side walls of the casing 13. A gear 59 secured to the left end of the shaft 58 meshes with an internal gear 60 keyed to a shaft 61 extending transversely into the casing 13. Secured to the inner end of the shaft 61 is a drive pinion 62 meshing with a rack gear 63 formed on the sleeve 17 and extending longitudinally thereof.

Mounted on the right end of the shaft 58 outwardly of the gear 56 is a hand wheel 64 by which the sleeve 17 may be operated manually when the power drive is disconnected.

A coil spring 39 is disposed on the upper end of the spindle 14 between a collar 40 thereon and the housing 37, and serves to take up any lost motion in the gear drive.

Trip means is provided for locking the handle 51 in raised position to close the clutch 57. This means comprises a latch lever 65 pivotally mounted on the handle 51. One arm of the lever 65 extends forwardly along the handle 51 and normally is urged away therefrom by a spring 66. The other arm of the lever 65 extends downwardly and is provided with a notch 67 adapted to engage a stud 68 on the head casing 13.

The latch lever 65 may be tripped manually when desired to open the clutch 57. Means also is provided to trip the latch lever 65 automatically to open the clutch 57 if the spindle 14 on its return stroke travels beyond a predetermined point. This means comprises a lever 69 pivoted intermediate its ends at 70 on the lower bearing 15. Of the lever 69, one end extends over the latch lever 65, and the other end extends over a heel or lug 71ª on the lower end of a vertical trip rod 71. Adjustably secured to the upper end of the rod 71 is a stop nut 72. A trip arm 73 is clamped to the sleeve 17 for movement therewith, and slidably embraces the rod 71 below the nut 72. If in its upward movement with the arm 73, the heel 71ª engages the lever 69, the latter will be oscillated against the latch lever 65 to release the handle 51 so as to open the clutch 57. To reinstitute the machine operation the handle 51 must be reset manually.

The operating mechanism for the clutch 36 comprises a clutch link 79 pivotally mounted in the housing 38 and engaging a peripheral groove 80 in the clutch sleeve 34. The link 79 projects between two spaced adjustable stops 81 and 82, and is pivotally connected to the outer end of a piston rod 83. The latter is connected to a piston 84 slidably disposed in a cylinder 85 on the housing 38. The cylinder 85 is provided with end ports 86 and 87, and with an intermediate port 88 controlled by the piston 84.

Actuation of the clutch 36 is under the control of a suitable pilot valve 89 for directing pressure fluid selectively to ports 86 and 87. In the present instance, the valve 89 comprises a cylindrical casing 90 mounted on one side of the head casing 13. The valve casing 90 is formed centrally with an inlet port 91, and at opposite ends with discharge ports 92 and 93 and also interconnected exhaust ports 94 and 95. Slidably disposed in the casing 90 is a valve piston 96 adapted upon being reciprocated to alternately connect the inlet port 91 with the discharge ports 92 and 93 and simultaneously to connect the latter alternately to the exhaust ports 94 and 95, respectively.

The discharge ports 92 and 93 are connected respectively through pressure fluid lines 99 and 100 to the ports 86 and 87 of the cylinder 85. Pressure fluid from any suitable source may be supplied to the inlet port 91, and, in the present instance, the latter is connected through a main supply line 101 to the discharge side of a gear pump 102. The suction side of the pump 102 is connected through a line 103 to a sump 104 containing a supply of a suitable actuating media, such as oil. The exhaust ports 94 and 95 are connected through a line 105 to the line 103. Branching from the line 101 to the sump 104 is a suitable by-pass line 106 in which a pressure relief valve 107 is interposed. The valve 107 may be set to maintain in the line 101 a suitable predetermined pressure, for example 150 pounds per square inch, by spilling all excess pressure fluid delivered by the pump 102.

To actuate the pilot valve 89 in opposite directions at the ends of the reciprocation of the spindle 14, the valve piston 96 is connected to a piston rod 160 pivotally connected at its outer end to the free end of a crank arm 162. Interposed in the rod 160 is a yieldable take-up 161. The crank arm 162 is secured on one end of a transverse rock shaft 163 extending through the head casing 13. Secured to the other end of the shaft 163 is a crank arm 164 having a longitudinal slot 165. A depending link 166 threaded loosely on a threaded extension 167 of the shaft 61 has a pin 168 on its lower end engaging in the slot 165. The extension 167 is provided with a fixed stop 169 and an adjustable stop 170 at opposite sides of the link 166. Thus, during rotation of the shaft 61 the threaded connection between the link 166 and the shaft 61 causes the link 166 to move along the extension 167 synchronously with the longitudinal movement of the spindle 14. At the end of the feeding stroke, the link 166 engages the adjustable stop 170 and since longitudinal movement is prevented by the stop, the link is rotated by the shaft 61 to move the piston rod 160 inwardly. At the end of the return stroke, the stop 169 causes rotation of the link 166 in the opposite direction to move the piston rod 160 outwardly.

The work carriage 12 in the present instance is provided with guideways 107 slidably engaging guides 108 on the front of the pedestal 11, and is supported for vertical adjustment by a screw jack 109 on the base 10.

Rotatably mounted on the carriage 12 is a horizontal work table 110 adapted to support a plurality of individual work holders, such as the collet fixtures 111. The table 110 is provided with a depending concentric annular wall or drum 112 rotatable within an upstanding circumferential wall 113 on the carriage 12. An inner peripheral retaining flange 114 on the upper end of the wall 113 engages in an outer peripheral notch 115 in the upper end of the wall 112 to retain the work table in position.

Means is provided for automatically indexing the work table 110 so as to present the different work holders to the tool 19 in successive feeding strokes of the latter. To this end, the table 110 is formed with an annular depending hub flange 116 rotatable in a depression 117 in the top of a base 12ª on the carriage 12. A ratchet 118 in the form of a ring is rotatable on the hub flange 116, and is formed in its inner peripheral surface with a plurality of ratchet notches 119, one for each work position. Slidably disposed in a radial opening 120 in the hub flange 116 is a tooth detent or pawl 121 urged outwardly by a spring 122. The detent 121 is adapted to engage the ratchet notches 119 selectively for the purpose of transmitting rotation in one direction of the ratchet to the table 110, but is ineffectual to effect rotation of the table in the opposite direction.

To prevent back-lash or drag when the ratchet 118 moves over the detent 121, the table 110 is formed with a depending peripheral flange 123 outside of the carriage wall 113. The end of the flange 123 is formed with ratchet teeth 124 in engagement with a gravity pawl 125 pivoted on the wall 113.

To rotate the ratchet 118 periodically in opposite directions so as to index the table 110, the ratchet 118 is formed on its outer periphery with gear teeth 126 in mesh with a gear rack bar 127 reciprocable in a guideway 128 in the base 12ª. The rack bar 127 extends through the wall 113, and is operatively connected at its outer end to a piston 129 slidably disposed in a cylinder 130 on the base 12ª. The cylinder 130 is formed with end ports 131 and 132 connected respectively through branch lines 133 and 134 to the lines 99 and 100. Interposed in the line 134 is a pressure reducing valve 135 adapted to transmit a predetermined pressure, for example 60 pounds per square inch, to the port 132. The cylinder 180 also is formed with an intermediate port 136 adapted to be brought alternately into communication with the ports 131 and 132 upon reciprocation of the piston 129, and so located that it will be exposed to the high pressure end of the cylinder shortly before the rack bar 127 reaches its outermost position.

It will be evident that upon actuation of the valve 89, at the end of the return stroke of the spindle 14, into position to institute the next feeding stroke, the rack bar 127 will be moved outwardly in an indexing stroke, and that upon actuation of the valve into the other position occupied during the return stroke the rack bar will be retracted in a return stroke preparatory for the next indexing stroke.

Means is provided for accurately locating the work table 110 after each indexing movement, and for locking the table in position until the succeeding indexing movement is instituted. To this end, the wall 112 is formed with a plurality of openings 137 corresponding in number and relative spacing to the ratchet notches 119. Inserted in the outer end of each opening 137 is a bushing 138 having an outwardly flared recess or seat 139. A plunger 140 is slidably mounted in a bushing 141 in the wall 113 for selective engagement in the recesses 139. The outer end of the plunger 140 is operatively connected to a piston 142 slidably disposed in a cylinder 143 on the base 12ª. The cylinder 143 is formed with inner and outer end ports 144 and 145 connected respectively through a branch line 146 to the line 99 and a line 147 to the intermediate port 136 of the cylinder 130. The cylinder 143 also is formed with an intermediate port 148 located in a position such that it will be uncovered by the piston 142 when the plunger 140 is seated in one of the recesses 139.

In the indexing operation, when the valve 89 is actuated to direct pressure fluid to the ports 131 and 144, the plunger 140 is withdrawn from the table 110, and closes the port 148. Thereupon, the rack bar 127 moves through its indexing stroke. Shortly before completion of the indexing stroke, the piston 129 uncovers the port 136, thereby impressing a high pressure against the outer end of the piston 142. The pressure differential acting on the piston 142 causes the latter to move the plunger 140 into engagement with the wall 112. When the next recess 139 moves into registration with the plunger 140 at the end of the indexing movement, the plunger snaps into the recess, thereby accurately locating the table 110 and locking it in position until the next indexing movement is instituted.

It will be evident that the reciprocation of the spindle 14 is under the control of the clutch 36. An important object of the invention resides in the provision of means for preventing the complete reversal of the clutch 36 into the down feed position until after the indexing movement has been completed. This means comprises a lateral arm or lug 149 on the link 79, and a plunger 150 having a detent in the form of a head 151 adapted to be moved into the path of the lug so as to limit the movement of the clutch 36 toward the down feed position to the neutral position. In other words, the head 151 when in operative position permits a preparatory movement of the clutch 36, but until withdrawn prevents a full movement thereof. The plunger 150 is secured to a piston 152 slidably disposed in a cylinder 153 mounted alongside of the cylinder 85. The cylinder 153 is formed in opposite ends with ports 154 and 155 connected respectively through a line 156 to the intermediate port 148 of the cylinder 143, and a line 157 to the intermediate port 88 of the cylinder 85. The line 157 is connected by a shunt line 158 directly to the line 100. Interposed in the line 158 is a check valve 159 for preventing pressure fluid from passing directly from the line 100 to the line 157.

Upon actuation of the valve 89 at the end of the return stroke of the spindle 14, pressure fluid is directed to the ports 86, 131 and 144 of the cylinders 85, 130 and 143 respectively but not to the port 154 of the cylinder 153. Thereupon, the clutch 36 is moved into neutral position in which it is held temporarily by the detent head 151, and the plunger 140 is retracted to institute the indexing movement. When the plunger 140 is retracted the port 148 is closed so as to maintain the head 151 in operative position. At the completion of the indexing operation, the port 148 is uncovered, and serves to connect the line 99 through lines 147 and 156 to the port 154 of the cylinder 153. This causes the head 151 to be withdrawn which in turn permits the clutch movement to be completed. In this latter connection, it will be observed that the pressure on the clutch shifting piston 84 is continued during the indexing operation so as to maintain a yielding force which becomes effective to complete the movement of the clutch when the stop is withdrawn upon the completion of the indexing operation.

Figure 1:
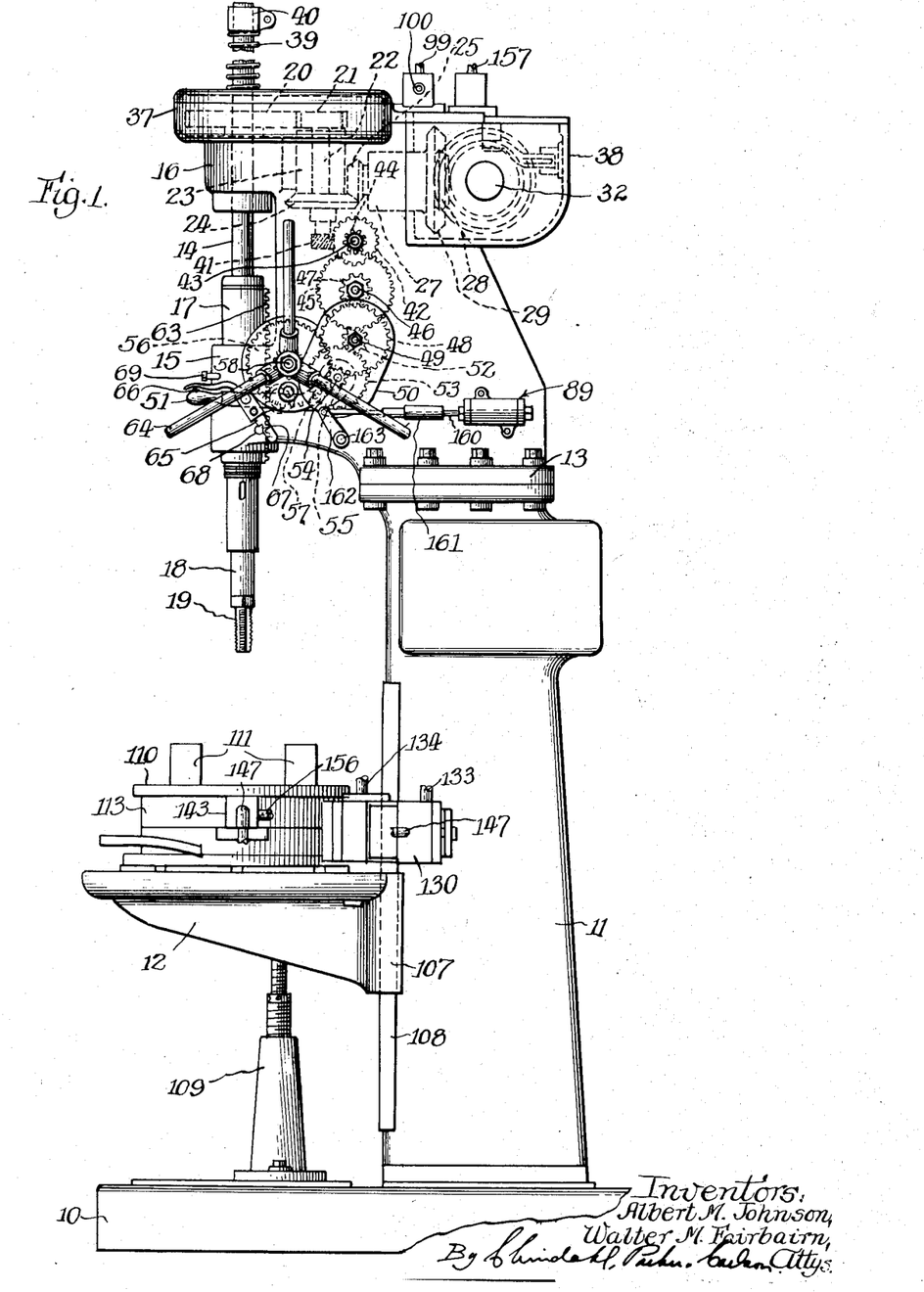
Figure 1 is a side elevation of a machine tool embodying the features of our invention.
Figures 2, 3:
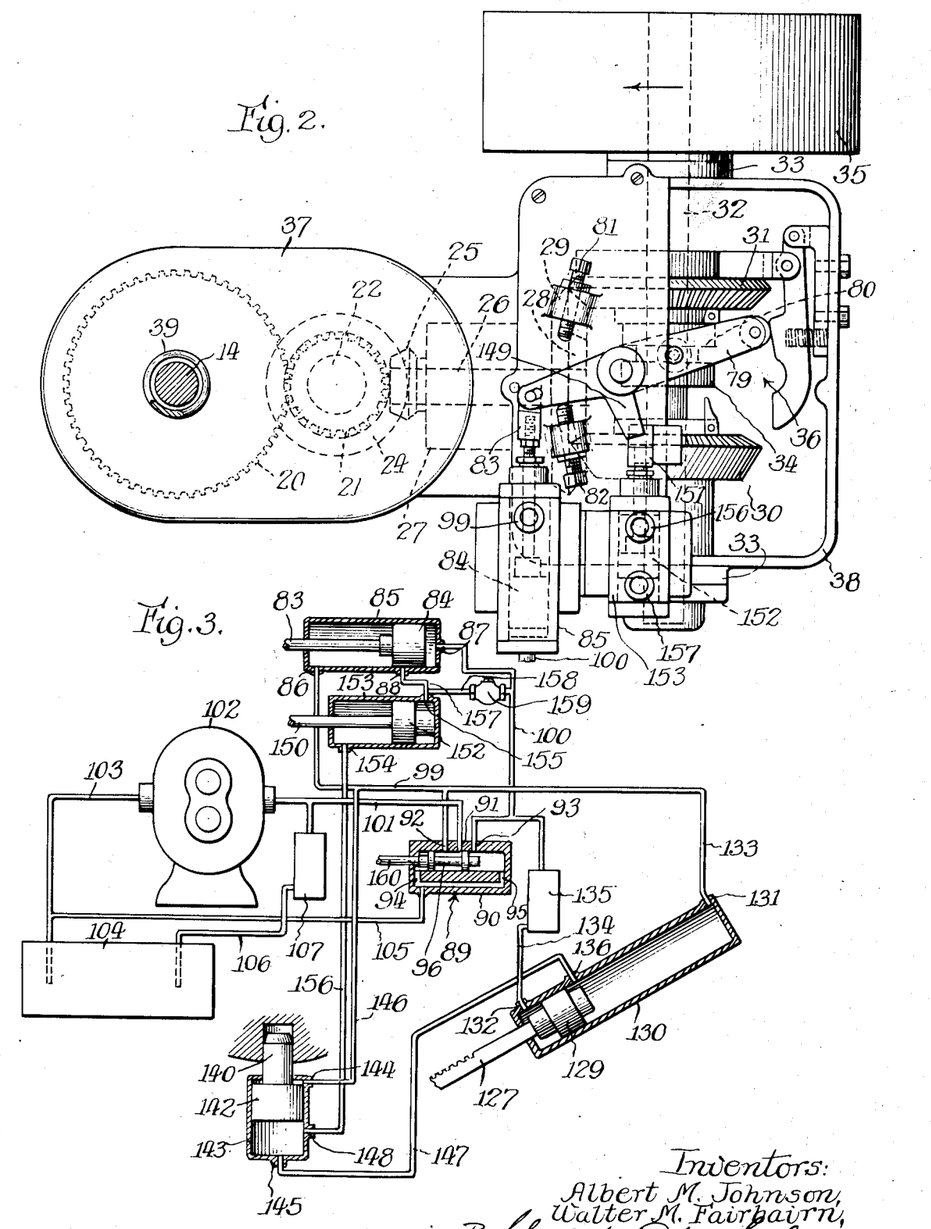
Fig. 2 is a plan view of the machine.
Fig. 3 is a diagrammatic representation of the hydraulic operating mechanism for the machine.
Figure 4:
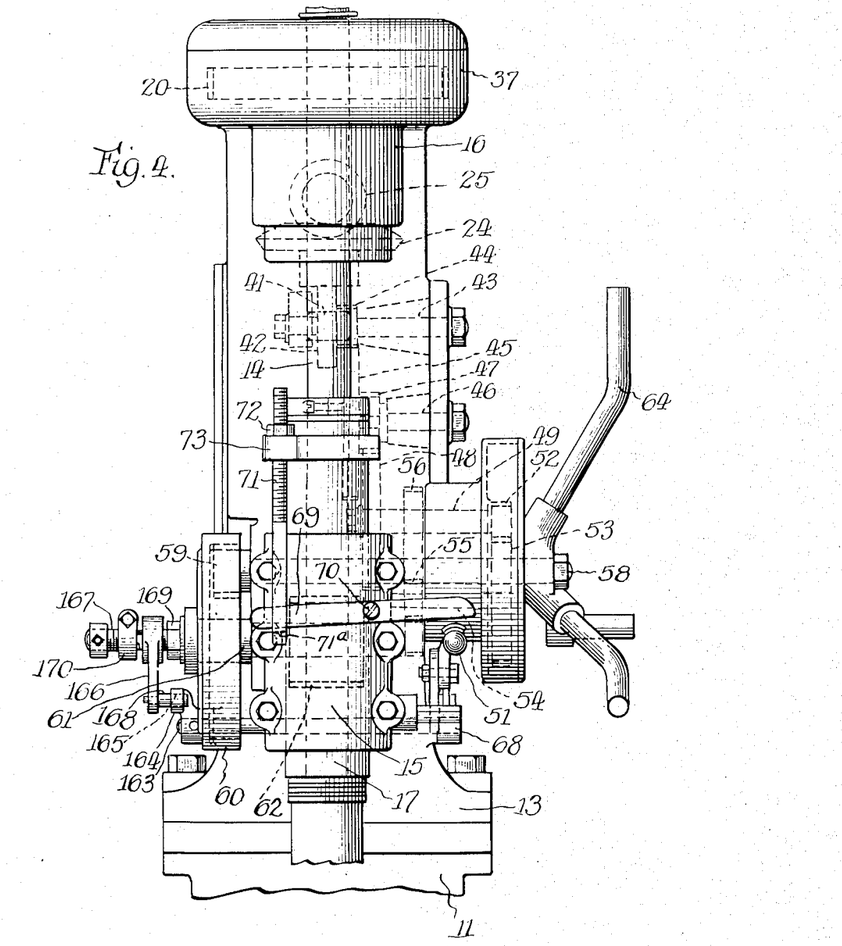
Fig. 4 is a fragmentary front elevation of the machine.
Figure 5:
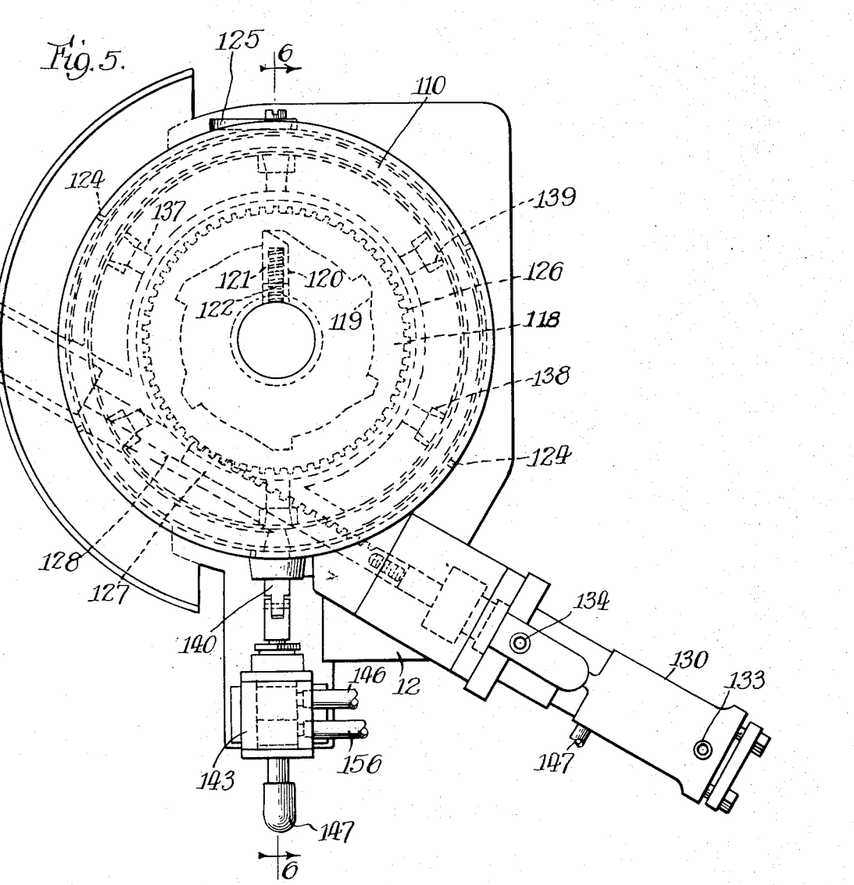
Fig. 5 is a plan view of the work support.
Figure 6:
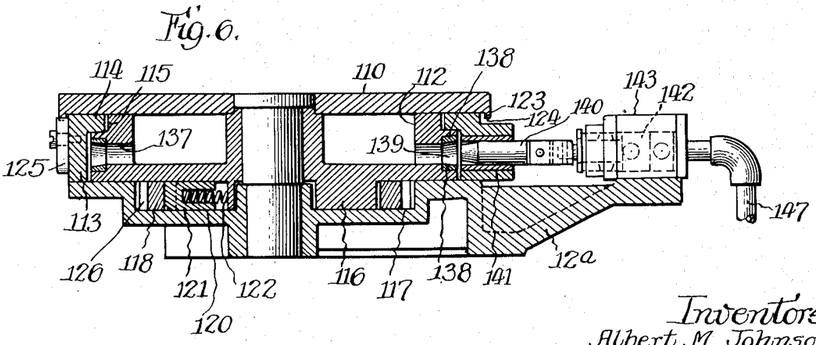
Fig. 6 is a sectional view taken along line 6—6 of Fig. 5.

The operation will be obvious from the foregoing description, and now will be summarized. Assuming the pulley 35 to be rotating in the direction of the arrow, and the return stroke of the spindle 14 to be in progress, at the end of this stroke, the stop 170 actuates the link 166 to move the piston 96 of the valve 89 to the left (Figs. 1 and 3). The clutch 36 now is moved into its neutral position in which it is held by the head 151. Simultaneously, the lock plunger 140 is retracted, and thereupon the rack bar 127 is moved outwardly to index the table 110.

Near the end of the indexing movement the plunger 140 is returned to the table 110, and at the end of the indexing movement, the plunger locks the table in position. Thereupon, final movement of the clutch 36 is effected to institute the feeding stroke of the spindle 14. At the end of the feeding stroke, the stop 170 actuates the link 166 to shift the valve 89 to the right. Thereupon the clutch 36 is reversed to reverse the direction of rotation of the spindle 14, the head 151 is moved outwardly into operative position, and the rack bar 127 is moved inwardly in preparation for the next indexing movement. The foregoing cycle then is repeated.

It will be observed that I have provided means of an advantageous character for controlling the clutch of a power driven mechanism for effecting relative reciprocation between a tool support and a work support in a machine tool; and that such method of clutch control lends itself readily to control from a remote point, being especially adapted for operation under the control of the work support upon the completion of the indexing operation. An important advantage resides in the certain and positive operation of the clutch at the proper time.

We claim as our invention:

1. A machine tool comprising, in combination, a rotary work support, a tool mounted for reciprocation toward and from said support, each reciprocation comprising a feeding stroke and a return stroke, means for reciprocating said tool, hydraulic means for indexing said support during the interval between successive feeding strokes, hydraulic means automatically operable at the end of each indexing movement to lock said support in position, and hydraulic means automatically operable in each instance to prevent institution of the feeding stroke until said last mentioned means has locked said support in position.

2. A machine tool comprising, in combination, a movable work support, a tool mounted for reciprocation toward and from said support, said reciprocation comprising alternate feeding and return strokes, means for automatically reciprocating said tool, said last mentioned means including a reversing member, means for indexing said support, and means under the control of said indexing means operable to move said member into neutral position at the end of each return stroke but to prevent full reversal until the indexing operation is completed.

3. A machine tool comprising, in combination, a movable work support, a tool mounted for reciprocation toward and from said support, said reciprocation comprising alternate feeding and return strokes, means for automatically reciprocating said tool, said last mentioned means including a reversing member, hydraulic means for indexing said work support, and hydraulic means under the control of said indexing means operable to move said member into neutral position at the end of each return stroke but to prevent full reversal until the indexing operation is completed.

4. A machine tool having, in combination, work and tool supports mounted for relative reciprocation, a train of gearing for reciprocating one of said supports, said train of gearing including a reversing clutch and a drop clutch, means controlled by the position of the movable support for actuating said reversing clutch at opposite ends of said movement, latch means for holding said drop clutch in closed position, and means operable upon movement by the movable support beyond a predetermined point for tripping said latch means to open said drop clutch.

5. A machine tool having, in combination, a work support, a tool supporting member mounted for reciprocation toward and from said work support, means for reciprocating said member, said means including a reversing member and a stop member, means controlled by the position of said reciprocable member for actuating said reversing member at opposite ends of said movement, trip means for holding said stop member in closed position, and means operable upon movement by said reciprocable member beyond the range of reciprocation defined by said second mentioned means for tripping said trip means to open said stop member.

6. A machine tool comprising, in combination, a work support, a tool supporting member reciprocable toward and from said work support, a drive connection for said member, said drive connection including a reversing member and a stop member, means responsive to the reciprocation of said first mentioned member for actuating said reversing member, a latch mechanism for holding said stop member in position to complete said drive connection, and a trip mechanism adapted to be actuated by movement of said first mentioned member beyond one end of the normal range of reciprocation to trip said latch mechanism so as to break said drive connection.

7. A machine tool comprising, in combination, a work support, a tool supporting member reciprocable toward and from said work support, a drive connection for said member, including a movable clutch element, an hydraulic piston and cylinder unit for actuating said element, a control valve for said unit, means movable into position to prevent actuation of said element in one direction beyond a neutral position, and an hydraulic piston and cylinder unit for moving said last mentioned means into and out of operative position.

8. A machine tool comprising, in combination, a work support, a tool supporting member reciprocable toward and from said work support, a drive connection for said member, including a movable clutch element, an hydraulic piston and cylinder unit for actuating said element, a control valve for said unit, means movable into position to prevent actuation of said element in one direction beyond a predetermined position, and means for moving said last mentioned means into and out of operative position.

9. In a machine tool, in combination, a work support, a tool support reciprocable toward and from said work support, means for actuating said tool support including a reversing clutch comprising a clutch actuating member, a piston and cylinder unit for actuating said member, said member having a stop arm, and a second piston and cylinder unit having a stop dog movable into and out of the path of said arm.

10. A machine tool comprising, in combination, a movable work support, a tool mounted for reciprocation toward and from said support, means including a clutch for automatically reciprocating said tool in a feeding stroke and a return stroke, hydraulic means for indexing said support during the interval between two successive feeding strokes, and hydraulic means operatively interlocked with said indexing means for preventing institution of the feeding stroke until the indexing movement has been completed, said last mentioned means including a valve operable in response to the movement of said tool, means controlled in part by said valve adapted to actuate said clutch, and a device operable upon the completion of each indexing operation and cooperating with said valve to render the last mentioned means effective to operate said clutch.

11. A machine tool comprising, in combination, a movable work support, a tool mounted for reciprocation toward and from said support, a drive connection for said tool including a reversing member, hydraulic means for controlling said member including a valve automatically reversible by said tool at the ends of the reciprocation, means controlled by said valve for automatically indexing said support in timed relation to said reciprocation, and an interlock between said reversing member and said means operable to prevent institution of the approaching stroke of the tool until the indexing movement has been completed in each cycle.

12. A machine tool comprising, in combination, a movable work support, a tool mounted for relative reciprocation toward and from said support, means including a reversing member for driving said tool, hydraulic means for actuating said reversing member, indexing means for said support, hydraulic means movable into and out of operative position to limit the movement of said reversing member, and a valve reversible by said tool at the ends of its reciprocation, said valve controlling said indexing means and both hydraulic means, said indexing means being operatively interposed between said valve and said last mentioned hydraulic means to control the latter during the indexing operation.

13. A machine tool comprising, a tool support and a work support, one of which is reciprocable and the other of which is indexable, actuating means for the reciprocable support including a clutch member having a neutral position, means automatically operable in timed relation to the movement of said reciprocable support to shift said clutch member with a yielding force, stop means to prevent movement of said clutch member past its neutral position when yielding force is applied to move it in one direction, means to index said indexable support, and means operable upon completion of such indexing movement to render said stop inoperative and permit completion of the movement of said clutch member by the yielding force applied thereto.

14. A machine tool comprising a reciprocatory support and an indexing support, one of which carries a tool and the other of which constitutes a work support, means for reciprocating said reciprocatory support, including a clutch member, hydraulic means acting automatically in timed relation to the movement of said reciprocatory support to shift said clutch member, means for indexing said indexable support, automatically operated means for locking said indexable support in its indexed positions, a shiftable detent operable in its active position to prevent completion of the shifting movement of said clutch member, means controlled by the shifting means of said clutch member to shift said detent to its active position, and means controlled by said locking means to shift said detent to its inactive position.

15. A machine tool comprising a reciprocatory tool, an indexing work support, automatically operable means for reciprocating said tool including a clutch member having a neutral position, means operable automatically in timed relation to the movement of said tool to index said support, a detent operable in its active position to prevent shifting of said clutch member beyond its neutral position, means operable as an incident to the shifting of said clutch member in one direction to move said detent to its active position, and operable as an incident to the completion of an indexing movement of said support to move said detent to its inactive position.

16. A machine tool comprising in combination, a reciprocable tool, an indexable support, means for automatically reciprocating said tool including a reversing member and a hydraulic piston and cylinder device for shifting the reversing member, a hydraulic piston and cylinder device for indexing said support, a locking element for said indexing support, a piston for operating said element having a comparatively large effective area for locking said element and a smaller end area for unlocking the element, a valve for controlling the supply of pressure fluid to said pistons and arranged to be shifted alternately between two positions in timed relation to the tool movement, a detent for limiting movement of the piston and cylinder device of the reversing member, connections from one side of said valve for moving said indexing piston in one direction, and for successively reversing said element and shifting said detent to its active position, connections from the other side of the valve for shifting said reversing member from one position into operative engagement with said detent, for shifting said locking element, and for successively shifting said indexing piston in the other direction, locking said element and moving said detent to its inactive position in sequence.

17. A machine tool comprising a movable work support a tool mounted for reciprocation toward and away from said support, through a cycle comprising advancing and retracting strokes, means for automatically reciprocating said tool, means for indexing said support in timed relation to the movement of said tool, means for locking said support in its indexed positions, and hydraulically operated means including cooperating valve devices, one responsive to the movement of the tool and the other controlled by said locking means adapted to prevent advancing movement of the tool until said locking means is in its operative position.

18. A machine tool having a tool spindle, a work support, means for reciprocating said spindle toward and from said support including a clutch having a shiftable clutch member, hydraulic means comprising a piston and cylinder device for actuating said clutch member, a releasable stop for said member, a valve arranged to be shifted alternately between two positions in timed relation to the movements of the tool spindle, means controlled by said valve at a predetermined point in the movement of said spindle in a direction away from said support to admit pressure fluid to said piston and cylinder device so as to move said clutch member with a yielding force against said stop, and to actuate said clutch member upon the withdrawal of said stop whereby to institute movement of the spindle toward said support, and means controlled by said valve at a predetermined point in the movement of the spindle toward the work support to admit pressure fluid to the piston and cylinder device whereby to move said clutch member in a direction to institute return travel of the spindle.

19. A machine tool having a work support, a tool spindle movable toward and from said support, means for reciprocating said spindle comprising a power driven mechanism including a clutch having a shiftable clutch member, a piston and cylinder device for actuating said clutch, a releasable stop for holding said member in disengaged position, a second piston and cylinder device for governing the position of said stop, a valve arranged to be shifted alternately between two positions in timed relation to the movements of the tool spindle, means controlled by said valve at a predetermined point in the movement of the spindle toward the work support to apply pressure fluid to the first mentioned device whereby to move said clutch member in a direction to institute the return travel of the spindle, and to admit pressure fluid to said second device so as to position said stop in active position, and means controlled by said valve at a predetermined point in the return movement of the spindle for actuating said first device so as to move said clutch member against said releasable stop, said first device being operable upon the withdrawal of said stop to complete the movement of the clutch member into engaged position.

20. A machine tool having a rotary work support, a tool spindle movable toward and from said support, actuating means for said spindle including a clutch having a shiftable clutch member, a piston and cylinder device for actuating said clutch, a releasable stop for said member, a second piston and cylinder device for governing the position of said stop, a valve arranged to be shifted alternately between two positions in timed relation to the movements of the tool spindle, means controlled by said valve at a predetermined point in the movement of the spindle toward the work support to apply pressure fluid to the first mentioned device whereby to move said clutch member in a direction to institute the return travel of the spindle, and to admit pressure fluid to said second device so as to position said stop in active position, means controlled by said valve at a predetermined point in the return movement of the spindle to cause said first device to move said clutch member against said releasable stop with a yielding force, means for indexing said work support, and means operable at a predetermined point in the movement of the work support by said indexing means to cause said second device to release said stop whereby to render said first device effective to move the clutch member into position to institute the next feeding stroke.

21. A machine tool having a tool spindle, a power driven mechanism, a rotary element operatively associated with said spindle to move it, a clutch for connecting said rotary element with said power driven mechanism and including a shiftable member, hydraulically actuated means including a piston and cylinder device and a valve operative as an incident to the movement of the spindle in one direction to apply pressure fluid to said device so as to exert a yielding force upon said member tending to move it into driving relation with said power driven mechanism, and releasable means operable to hold said clutch temporarily disengaged.

22. A machine tool comprising, in combination, a movable work support, a tool mounted for reciprocation toward and from said support, each reciprocation comprising a feeding stroke and a return stroke, means for reciprocating said tool including a clutch having a shiftable clutch member, hydraulic means operable during the interval between successive feeding strokes for indexing said support and for causing a yielding force to be exerted on said clutch member tending to shift it into down feed position, stop means operable to interrupt temporarily such movement of the clutch member into down feed position, means automatically operable at the end of each indexing movement to lock said support in position, and means operative as an incident to such locking of the support to render said stop means ineffective whereby to institute the feeding stroke of the next reciprocation.

23. A machine tool comprising a work support and a tool support, means for automatically reciprocating one of said supports through a cycle comprising advancing and retracting strokes and including a clutch, and means for initiating the advancing stroke of said movable support relative to the stationary support including an hydraulically operated means controlled by the movable support and adapted to actuate said clutch automatically at the end of the retracting movement of the support, a releasable detent for restraining movement of said clutch by said hydraulic means, and a control means for releasing said detent to permit the continued movement of said clutch by said hydraulic means.

In testimony whereof we have hereunto affixed our signatures.

ALBERT M. JOHNSON.
WALTER M. FAIRBAIRN.